United States Patent [19]

Shinagawa et al.

[11] Patent Number: 6,126,825
[45] Date of Patent: Oct. 3, 2000

[54] MICROPOROUS MEMBRANE AND PROCESS FOR THE PRODUCTION THEREOF

[75] Inventors: Yukio Shinagawa; Sumio Ohtani, both of Kanagawa, Japan

[73] Assignee: Fuji Photo Film Co., Ltd., Minami Ashigara, Japan

[21] Appl. No.: 09/126,713

[22] Filed: Jul. 31, 1998

Related U.S. Application Data

[63] Continuation-in-part of application No. PCT/JP97/04406, Dec. 2, 1997.

[30] Foreign Application Priority Data

Dec. 2, 1996 [JP] Japan ..................................... 8-321821
Dec. 2, 1996 [JP] Japan ..................................... 8-321822

[51] Int. Cl.$^7$ .................................................. B01D 39/14
[52] U.S. Cl. .............................. 210/500.33; 210/500.21; 521/50; 521/146
[58] Field of Search .................... 210/500.33, 500.21; 521/50, 146

[56] References Cited

U.S. PATENT DOCUMENTS

| | | | |
|---|---|---|---|
| 4,249,000 | 2/1981 | Batzer et al. | 536/66 |
| 4,326,958 | 4/1982 | Kawahara et al. | 210/500.33 |
| 4,643,829 | 2/1987 | Sundet | 210/500.33 |

FOREIGN PATENT DOCUMENTS

| | | |
|---|---|---|
| 51-151275 | 12/1976 | Japan . |
| 53-76172 | 7/1978 | Japan . |
| 5-148413 | 6/1993 | Japan . |
| 7-196736 | 8/1995 | Japan . |

Primary Examiner—J Cooney
Attorney, Agent, or Firm—Burns, Doane, Swecker & Mathis, LLP

[57] ABSTRACT

The present invention relates to a microporous membrane and a process for producing thereof, especially a microporous membrane which can be used for microfiltration, has excellent resistance to chemicals, and a process for producing thereof.

The present invention provides a microporous membrane having excellent resistance to chemicals, and a microporous membrane which facilitates waste disposal, and a process for producing thereof.

The microporous membrane has a bubble point value measured by the use of ethanol (by the test method of JIS K3832) falling in the range of from 10 kPa to 1000 kPa and comprises a polymer prepared by ring opening polymerization of a compound represented by chemical formula (I) or a polymer which is a ring opening polymer or ring opening copolymer represented by chemical formula (II). An example of the ring opening ring polymer or ring opening copolymer is a norbornene resin.

The process for producing the microporous membrane is as follows: A polymer prepared by ring opening polymerization of a compound represented by chemical formula (I) is heated and dissolved in a solvent (a) in which the polymer is soluble, and casted to form a solution membrane, which is rapidly cooled, and extracted with a washing solvent (b) in which the polymer is insoluble to remove the solvent (a), whereby the microporous membrane having a bubble point value measured by the use of ethanol (by the test method of JIS K3832) falling in the range from 10 kPa to 1000 kPa is obtained.

6 Claims, No Drawings

MICROPOROUS MEMBRANE AND PROCESS FOR THE PRODUCTION THEREOF

CROSS REFERENCE TO RELATED APPLICATIONS

This Application is a continuation-in-part of application Ser. No. PCT/JP97/04406, filed Dec. 2, 1997, which is designated the United States.

TECHNICAL FIELD

The present invention relates to a microporous membrane and a process for producing the same and more specifically to a microporous membrane which can be used for microfiltration and has excellent resistance to chemicals.

TECHNICAL BACKGROUND

Microporous membranes have been known since old times (for example, R. Kesting, Synthetic Polymeric Membranes, McGraw Hill) and have widely served as filters and so forth.

The microporous membranes are used for the filtration and sterilization of washing water for electronics, water for pharmaceuticals, water for manufacturing processes of pharmaceuticals, and water for foods. In recent years, the application and consumption of the membranes are being expanded, and particularly, highly reliable microporous membranes receive attention and are in wide use for the purpose of capturing particles.

TECHNICAL PROBLEM

The development of filters which have high resistance to chemical liquids such as acids, alkalis, and oxidizing agents with undergoing little extraction has been recently expected in the production of semiconductors. Filters formed of polytetrafluoroethylene (PTFE) as a material have been mainly used for the filtration of such chemical liquids recently. However, the PTFE filters show high hydrophobic nature, and even when the filters are wetted with 2-propanol prior to filtration, the air lock caused by the invasion of a trace of air bubbles obstructs the filtration. In addition, the filters have the disadvantage of generating poisonous gases by the combustion of used filters in waste disposal.

Specifically speaking, polyethylene has poor thermal resistance and polysulfonic acid has poor resistance to chemicals.

A first object of the present invention is to provide a microporous membrane having excellent resistance to chemicals and a process for producing the membrane.

A second object of the present invention is to provide a microporous membrane facilitating waste disposal and a process for producing the membrane.

A third object of the present invention is to provide a microporous membrane having excellent thermal resistance and a process for producing the membrane.

DISCLOSURE OF THE INVENTION

These objects have been achieved by a microporous membrane which has a bubble point value measured by the use of ethanol falling in the range of-from 10 kPa to 1000 kPa, preferably in the range of from 10 kPa to 500 kPa and most preferably in the range of from 100 kPa to 300 kPa and comprises a polymer prepared by ring opening polymerization of a compound represented by chemical formula (I) described below.

Concrete means of achieving the objects are described below.

(1) A microporous membrane which has a bubble point value falling in the range of from 10 kPa to 1000 kPa in measurement by the use of ethanol (by the test method of JIS K3832) and comprises a polymer prepared by ring opening polymerization of a compound represented by the following chemical formula (I):

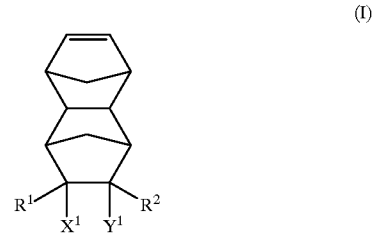

In the formula, $R^1$ and $R^2$ each represent a hydrogen atom or a hydrocarbon group having 1 to 10 carbon atoms; and $X^1$ and $Y^1$ each represent a hydrogen atom, a hydrocarbon group having 1 to 10 carbon atoms, a halogen atom, a halogen-substituted hydrocarbon group having 1 to 10 carbon atoms, —$(CH_2)_n COOR^{11}$, —$(CH_2)_n CN$, —$(CH_2)_n CONR^{11}R^{12}$, —$(CH_2)_n COOZ$, —$(CH_2)_n OZ$, —$(CH_2)_n W$, or (—CO)$_2$O or (—CO)$_2 NR^{14}$ formed by $X^1$ and $Y^1$. Furthermore, $R^{11}$, $R^{12}$, $R^{13}$, and $R^{14}$ each represent a hydrocarbon group having 1 to 20 carbon atoms; Z represents a hydrocarbon group or a halogen-substituted hydrocarbon group; W represents $SiR^{15}_p D_{3-p}$ ($R^{15}$ represents a hydrocarbon group having 1 to 10 carbon atoms; D represents a halogen atom, —$OCOR^{15}$, or —$OR^{15}$; and p represents an integer of 0 to 3.); and n represents an integer of 0 to 10.

(2) A microporous membrane as described in the foregoing (1) in which the polymer described above is a ring opening polymer or ring opening copolymer represented by the following chemical formula (II):

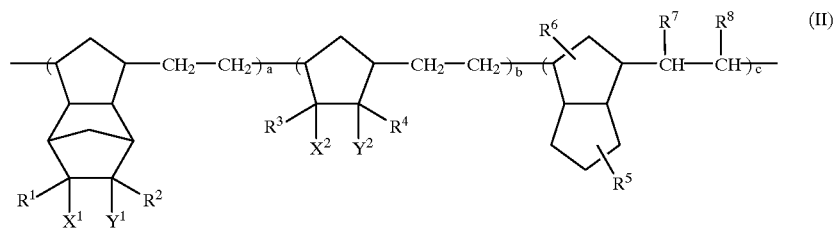

In the formula, $R^1$, $R^2$, $X^1$, and $Y^1$ have the same meanings as defined in chemical formula (I); $R^3$ to $R^5$ each represent a hydrogen atom or a hydrocarbon group having 1 to 10 carbon atoms; $R^6$ to $R^8$ each represent a hydrogen atom or a hydrocarbon group having 1 to 6 carbon atoms; and $X^2$ and $Y^2$ each represent a hydrogen atom, a hydrocarbon group having 1 to 10 carbon atoms, a halogen atom, a halogen-substituted hydrocarbon group having 1 to 10 carbon atoms, $-(CH_2)_nCOOR^{11}$, $-(CH_2)_nCN$, $-(CH_2)_nCONR^{11}R^{12}$, $-(CH_2)_nCOOZ$, $-(CH_2)_nOZ$, $-(CH_2)_nW$, or $(-CO)_2O$ or $(-CO)_2NR^{14}$ formed by $X^2$ and $Y^2$. $R^{11}$, $R^{12}$, $R^{13}$, and $R^{14}$ group or a halogen-substituted hydrocarbon group; W represents $SiR^{15}{}_pD_{3-p}$ ($R^{15}$ represents a hydrocarbon group having 1 to 10 carbon atoms; D represents a halogen atom, $-OCOR^{15}$, or $-OR^{15}$; and p represents an integer of 0 to 3.); and n represents an integer of 0 to 10.

(4) The process for producing a microporous membrane as described in the foregoing (3) in which the polymer described above is a ring opening polymer or ring opening copolymer represented by the following formula (II):

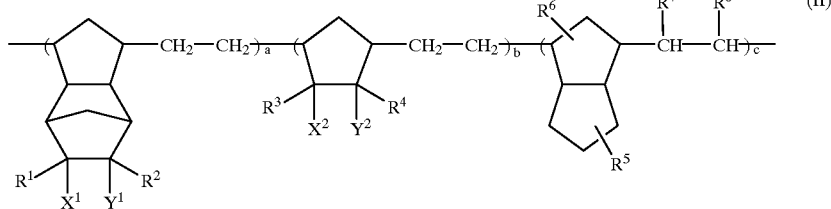

each represent a hydrocarbon group having 1 to 20 carbon atoms; Z represents a hydrocarbon group or a halogen-substituted hydrocarbon group; W represents $SiR^{15}{}_pD_{3-p}$ ($R^{15}$ represents a hydrocarbon group having 1 to 10 carbon atoms; D represents a halogen atom, $-OCOR^{15}$ or $-OR^{15}$; and p represents an integer of 0 to 3.); and n represents an integer of 1 to 10.

a is an integer of 1 to 2000; b and c are integers of 1 to 2000, respectively; and in addition, a, b, and c satisfy the following relations: $0 \leq a/(a+b+c) \leq 1$, $0 \leq b/(a+b+c) \leq 1$, and $0 \leq c/(a+b+c) \leq 1$.

(3) A process for producing a microporous membrane in which the polymer prepared by ring opening polymerization of a compound represented by the following chemical formula (I) is heated and dissolved in a solvent (a) in which said polymer is soluble, and the solution is casted to form a membrane, which is rapidly cooled and then extracted with a washing solvent (b) in which said polymer is insoluble to remove the solvent (a) from the membrane, thus to produce a microporous membrane having a bubble point value falling in the range of from 10 kPa to 1000 kPa in measurement by the use of ethanol (by the method of ASTM F316).

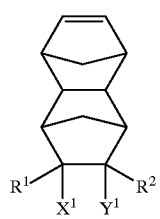

(I)

In the formula, $R^1$ and $R^2$ each represent a hydrogen atom or a hydrocarbon group having 1 to 10 carbon atoms; and $X^1$ and $Y^1$ each represent a hydrogen atom, a hydrocarbon group having 1 to 10 carbon atoms, a halogen atom, a halogen-substituted hydrocarbon group having 1 to 10 carbon atoms, $-(CH_2)_nCOOR^{11}$, $-(CH_2)_nCN$, $-(CH_2)_nCONR^{11}R^{12}$, $-(CH_2)_nCOOZ$, $-(CH_2)_nOZ$, $-(CH_2)_nW$, or $(-CO)_2O$ or $(-CO)_2NR^{14}$ formed by $X^1$ and $Y^1$. $R^{11}$, $R^{12}$, $R^{13}$, and $R^{14}$ each represent a hydrocarbon group having 1 to 20 carbon atoms; Z represents a hydrocarbon In the formula, $R^1$, $R^2$, $X^1$, and $Y^1$ have the same meanings as defined in chemical formula (I); $R^3$ to $R^5$ each present a hydrogen atom or a hydrocarbon group having 1 to 10 carbon atoms; $R^6$ to $R^8$ each represent a hydrogen atom or a hydrocarbon group having 1 to 6 carbon atoms; and $X^2$ and $Y^2$ each represent a hydrogen atom, a hydrocarbon group having 1 to 10 carbon atoms, a halogen atom, a halogen-substituted hydrocarbon group having 1 to 10 carbon atoms, $-(CH_2)_nCOOR^{11}$, $-(CH_2)_nCN$, $-(CH_2)_nCONR^{11}R^{12}$, $-(CH_2)_nCOOZ$, $-(CH_2)_nOZ$, $-(CH_2)_nW$, or $(-CO)_2O$ or $(-CO)_2NR^{14}$ formed by $X^2$ and $Y^2$. $R^{11}$, $R^{12}$, $R^{13}$, and $R^{14}$ each represent a hydrocarbon atom having 1 to 20 carbon atoms; Z represents a hydrocarbon group or a halogen-substituted hydrocarbon group; W represents $SiR^{15}{}_pD_{3-p}$ ($R^{15}$ represents a hydrocarbon group having 1 to 10 carbon atoms; D represents a halogen atom, $-OCOR^{15}$, or $-OR^{15}$; and p represents an integer of 0 to 3.);

and n represents an integer of 0 to 10.

a is an integer of 1 to 2000; b and c are integers of 1 to 2000, respectively; and in addition, a, b, and c satisfy the following relations: $0 \leq a/(a+b+c) \leq 1$, $0 \leq b/(a+b+c) \leq 1$, and $0 \leq c/(a+b+c) \leq 1$.

(5) A process for producing a microporous membrane in which a solution comprising a polymer prepared by ring opening polymerization of a compound represented by the following chemical formula (I), a solvent (c) which has a lower boiling point than water and satisfactorily dissolves the polymer described above, a solvent (d) which has a higher boiling point than the solvent (c) and can not dissolve the polymer, and water is casted to form a membrane, and the solvent is slowly vaporized to cause phase separation in said solution:

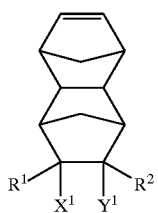

(I)

In the formula, $R^1$ and $R^2$ each represent a hydrogen atom or a hydrocarbon group having 1 to 10 carbon atoms; and $X^1$ and $Y^1$ each represents a hydrogen atom, a hydrocarbon group having 1 to 10 carbon atoms, a halogen atom, a halogen-substituted hydrocarbon group having 1 to 10 carbon atoms, $-(CH_2)_nCOOR^{11}$, $-(CH_2)_nCN$, $-(CH_2)_nNR^{11}R^{12}$, $-(CH_2)_nCOOZ$, $-(CH_2)_nOZ$, $-(CH_2)_nW$, or $(-CO)_2O$ or $(-CO)_2NR^{14}$ formed by $X^1$ and $Y^1$. $R^{11}$, $R^{12}$, $R^{13}$, and $R^{14}$ each represent a hydrocarbon group having 1 to 20 carbon atoms; Z represents a hydrocarbon group or a halogen-substituted hydrocarbon group; W represents $SiR^{15}{}_pD_{3-p}$ ($R^{15}$ represents a hydrocarbon group having 1 to 10 carbon atoms; D represents a halogen atom, $-OCOR^5$, or $-OR^{15}$; and p represents an integer of 0 to 3.); and n represents an integer of 1 to 10.

(6) A process for producing a microporous membrane as described in the foregoing (5) in which the polymer described above is a ring opening polymer or ring opening copolymer represented by the following chemical formula (II):

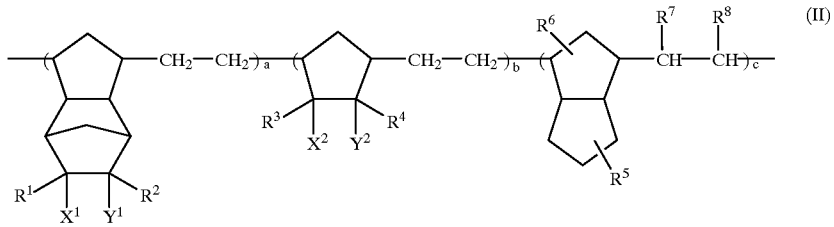

(II)

In the formula, $R^1$, $R^2$, $X^1$, and $Y^1$ have the same meanings as defined in chemical formula (I); $R^3$ to $R^5$ each represent a hydrogen atom or a hydrocarbon group having 1 to 10 carbon atoms; $R^6$ to $R^8$ each represent a hydrogen atom or a hydrocarbon group having 1 to 6 carbon atoms; and $X^2$ and $Y^2$ each represent a hydrogen atom, a hydrocarbon group having 1 to 10 carbon atoms, a halogen atom, a halogen-substituted hydrocarbon group having 1 to 10 carbon atoms, $-(CH_2)_nCOOR^{11}$, $-(CH_2)_nCN$, $-(CH_2)_nCONR^{11}R^{12}$, $-(CH_2)_n COOZ$, $-(CH_2)_nOZ$, $-(CH_2)_nW$, or $(-CO)_2O$ or $(-CO)_2NR^{14}$ formed by $X^2$ and $Y^2$. $R^{11}$, $R^{12}$, $R^{13}$, and $R^{14}$ each represent a hydrocarbon group having 1 to 20 carbon atoms; Z represents a hydrocarbon group or a halogen-substituted hydrocarbon group; W represents $SiR^{15}{}_pD_{3-p}$ ($R^{15}$ represents a hydrocarbon group having 1 to 10 carbon atoms; D represents a halogen atom, $-OCOR^{15}$ or $-OR^{15}$; and p represents an integer of 0 to 3.); and n represents an integer of 0 to 10.

a is an integer of 1 to 2000; b and c are integers of 1 to 2000, respectively; and in addition, a, b, and c satisfy the following relations: $0-a/(a+b+c)\leq 1$, $0\leq b/(a+b+c)\leq 1$, and $0\leq c/(a+b+c)\leq 1$.

To prepare polymers by ring opening polymerization from the compounds represented by chemical formula (I) used in the present invention, for example, the polycyclic unsaturated ester compounds included in the compounds represented by chemical formula (I) undergo metathesis ring opening polymerization followed by hydrogenation as disclosed in JP-A-1-240517 (The term "JP-A" as used herein means an "unexamined published Japanese patent application"), JP-A-7-196736, JP-A-60-26024, or JP-A-62-19801.

The coexistence of an additional polymerizable component in the ring opening polymerization leads to formation of the copolymer. Such copolymerizable components include the polymerizable components represented by chemical formula (II).

Examples of these polymers or copolymers are norbornene resins. Some resins included therein are commercially available.

For example, a process for producing microporous membranes from norbornene resins is divided into two stages; a stage of dissolving the resins in solvents and a stage of stretching. The norbornene resins are put on the market by Japan Synthetic Rubber Co., Ltd. under the trade names of Arton G and Arton F and by Nippon Zeon Co., Ltd. under the trade name of Zeonex 250 and Zeonex 280.

Solvents used for forming the membranes by the solvent dissolution method are solvents (a) in which the norbornene resins are soluble. Examples of the solvents (a) include chain and cyclic hydrocarbons such as decane, decalin and cyclohexane, aromatic hydrocarbons such as xylene, naphthalene and toluene, phthalic esters such as dioctyl phthalate, dimethoxyoxyethyl phthalate and dimethyl phthalate, phosphoric esters such as triphenyl phosphate and tricresyl phosphate, polyhydric alcohol esters such as glycerol triacetate, ethyl phthalyl ethylglycollate and methyl phthalyl ethylglycollate, higher aliphatic alcohols such as stearyl alcohol and ceryl alcohol, mineral oils such as coal oil and kerosine, ketones such as methyl ethyl ketone and methyl isobutyl ketone, halogenated hydrocarbons such as methylene chloride, chloroform and 1,1-dichloroethane, and esters such as methyl acetate and ethyl acetate.

These solvents can be used alone or as mixtures of two or more kinds thereof.

When methylene chloride, toluene, or xylene is used as the solvent, a norbornene resin is dissolved in such a solvent in the coexistence of a poor solvent in which the solubility of the resins is low, such as stearyl alcohol, cetyl alcohol, or methylpyrrolidone, at near boiling points of the solvents mixed. A solvent such as ethanol, methanol, or water in which the norbornene resins are quite insoluble can be added in an amount of as little as 10% or less to the solution thus obtained.

The norbornene resin solution thus prepared is subjected to casting on a support such as glass plates, plastic films, or metal plates with the aid of an applicator so as to be 50 from 500 microns in thickness. When a low boiling solvent such as methylene chloride is used, the solvent is preferentially evaporated by exposing the solution membrane having undergone the casting to a gentle wind at about room temperature to cause phase separation in the solution, thus a microporous membrane being formed.

Furthermore, the solution membrane having undergone the casting is immersed in a solvent such as 2-propanol or ethanol in which the resin is quite insoluble to form a microporous membrane.

Next, a process for producing the norbornene resin microporous membranes by the use of solvents which can not dissolve norbornene resins at a temperature of 100° C. or lower but can dissolve the resins at an increased temperature of 100° C. or higher, for example, just at 200° C. or higher, is described below. Examples of such solvents include phthalic esters such as dioctyl phthalate, higher aliphatic alcohols such as stearyl alcohol, mineral oils such as coal oil and kerosine, methylpyrrolidone, and 2-pyrrolidone.

A norbornene resin solution prepared by heating the resin to 220° C. in the presence of an antioxidant (i.e., 2,6-di-t-butyl-p-cresol or tetrakis[methylene-3-(3,5-di-t-butyl-4-hydroxyphenyl)-propionate]methane) is stretched on a support such as glass plates, plastic films, or metal plates at 200° C. so as to be 50 to 500 microns in thickness, and then rapidly cooled. For the rapid cooling, it is effective to throw the solution membrane together with the support into a liquid having a large heat capacity such as water, ethylene glycol, or butanol, or mixtures thereof. A temperature drop by the rapid cooling is usually from 20° C. to 200° C., and preferably from 50° C. to 150° C. The norbornene resin solution in which the resin has been dissolved in a solvent to keep an uniform solution is separated by the rapid cooling into two phases, a phase having high resin concentrations and a phase having low resin concentrations; and then gels.

The gel membrane is washed, for example, in isopropanol heated at 70° C. to completely remove the solvent, thus producing a microporous membrane formed of the norbornene resin. It is quite necessary that washing solvents (b) for removing membrane-forming solvents (a) can dissolve the solvents (a) but not dissolve norbornene resins, and it is preferred that the solvents (b) have low boiling points. Examples of preferred solvents (b) are lower alcohols such as methanol, ethanol, or 2-propanol.

In order to produce the membranes, the solution described above is allowed to stream down through a die such as a slit having a narrow width in thin membrane form, and rapidly cooled to form a thin membrane.

The membrane which is freed of the solvents by washing is dried with the aid of heat. The membrane thus produced can be used for filtration of almost all solutions of acids, alkalis and oxidizing agents except for concentrated sulfuric acid and concentrated nitric acid.

For the production of the microporous membranes from the norbornene resins, in addition to the methods described above, there also is a method of dissolving the resins, not simply, but in a mixture of two kinds of solvents: one in which the resins are soluble and the other in which the resins are insoluble. This method facilitates the selection of microporous conditions of the membranes.

Good solvents (c) for the resins used in the solvent dissolution method (hereinafter occasionally referred to as "good solvents (c)") include chain and cyclic hydrocarbons such as heptane, hexane and cyclohexane, aromatic hydrocarbons such as benzene and toluene, ketones such as methyl ethyl ketone and acetone, halogenated hydrocarbons such as methyl chloride, chloroform and 1,1-dichloroethane, and esters such as methyl formate, methyl acetate and ethyl acetate. These good solvents (c) can be used alone or as mixtures of two or more kinds thereof. The good solvents (c) should be appropriately selected, depending on the kinds of substituent groups and polymerization degrees of the norbornene resins used. It is preferred that the good solvents (c) have lower boiling points than water, and particularly boiling points of 70° C. or lower.

Poor solvents (d) for the resins used in the solvent dissolution method (hereinafter occasionally referred to as "poor solvents (c)") are preferably alcohols such as methanol, ethanol, 2-propanol, and butanol. It is necessary that a poor solvent (d) used has a higher boiling point than a good solvent (c) used in all cases.

After a norbornene resin is dissolved in a good solvent (c), a poor solvent (d) and water are slowly added to the solution with stirring. The addition thereof is stopped immediately before a white turbidity or precipitate appears. The content of the norbornene resins in the entire solution is from 5% to 20%, and preferably from 8% to 15%. The content of poor solvents (d) is from 15% to 30% in many cases. The content of water is from 1% to 5% at most. As a matter of course, the content of poor solvents (d) or water varies depending on the kinds of the norbornene resins or good solvents (c) used.

A norbornene resin dissolved in such mixed solvents is subjected to casting on a support such as glass plates, plastic films, or metal plates with the aid of an applicator so as to be from 50 to 500 microns in thickness, and the solution membrane thus produced is gently dried by exposing the membrane to a breeze at room temperature or a lower temperature. This leads to preferential evaporation of a low boiling good solvent (c) to cause phase separation in the solution. Further, the membrane gels by the complete evaporation of the good solvent (c) to form a microporous membrane. The poor solvents (d) and water left are removed by heating.

The microporous membrane thus produced can be used for the filtration of nearly all solutions of acids, alkalis, and oxidizing agents except for concentrated sulfuric acid and concentrated nitric acid.

The microporous membrane formed herein is isotropic.

When used for filtration, the microporous membranes produced in the present invention preferably range from 10 kPa to 1000 kPa in the bubble point value measured by the use of ethanol. The bubble point value is measured by the test method of JIS K3832. Bubble point values measured by this method are nearly similar to those measured by the method of ASTM F316.

In the present invention, the bubble point value preferably falls in the range of from 10 kPa to 500 kPa, more preferably in the range of from 100 kPa to 300 kPa.

BEST MODE FOR ATTAINING THE INVENTION

The present invention is illustrated below through the following examples. However, the invention is not limited by these examples.

EXAMPLE 1

Fifteen parts of a norbornene resin (Arton G, manufactured by Japan Synthetic Rubber Co., Ltd.) were dissolved in 85 parts of dioctyl phthalate by heating at 120° C. This solution was subjected to casting on a stainless steel plate maintained at 100° C. or above so as to be approximately 200 microns in thickness, and the resulting solution membrane were immediately thrown into water at 20° C. to rapidly cool. The white membrane formed was washed in ethanol heated to 60° C. for 1 hr and then taken out to dry. The bubble point value of this membrane measured by the use of ethanol (by the method of JIS K3832) was 60 kPa and the flow velocity of water permeability was 65 ml/cm²/min (differential pressure 0.1 MPa).

EXAMPLE 2

Twelve parts of a norbornene resin (Arton G, manufactured by Japan Synthetic Rubber Co., Ltd.) were dissolved and kneaded in a mineral oil with a viscosity of 70 cP (40° C.) at 220° C., and a membrane was extruded from an extruder die at 180° C., cooled in water at 24° C., washed in 2-propanol at 70° C. for 2 hr, and then taken out to dry.

The bubble point value of this membrane measured by the use of ethanol was 120 kPa and the flow velocity of water permeability was 8 ml/cm²/min (differential pressure 0.1 MPa).

EXAMPLE 3

Twenty parts of a norbornene resin (Arton G, manufactured by Japan Synthetic Rubber Co., Ltd.) were dissolved in 20 parts of toluene and 60 parts of N-methyl-2-pyrrolidone by heating at 70° C. The resulting solution was subjected to casting on a glass plate with the aid of an applicator, and the solution membrane together with the plate was immersed in ethanol for 1 hr. The membrane washed and dried was 330 kPa in ethanol bubble point (by the method of JIS K3832) and the flow velocity of water permeability was 1.8 ml/cm²/min (differential pressure 0.1 MPa).

EXAMPLE 4

A solution comprising 12 parts of norbornene resin (Arton G, manufactured by Japan Synthetic Rubber Co., Ltd.), 65 parts of methylene chloride, 21 parts of methanol, and 2 parts of water was prepared, and stretched on a glass plate in thin layer form with the aid of an applicator. The resulting membrane was exposed to a breeze maintained at 25° C. for about 1 hr to form a microporous membrane and further to a strong wind maintained at 60° C. to dry.

The bubble point value of the membrane measured by the use of ethanol was 120 kPa and the flow velocity of water permeability was 7 ml/cm²/min (differential pressure 0.1 MPa).

INDUSTRIAL APPLICABILITY

In the present invention, the microporous membranes resist strong acids such as concentrated sulfuric acid and concentrated nitric acid, showing excellent resistance to chemicals. Furthermore, the microporosity of the membranes are suitable for filtration of liquids, and also for microfiltration thereof. In addition, the membranes introduce no problem of waste disposal.

The microporous membranes having the microporosity suitable for the microfiltration can be easily produced according to the process of the present invention.

We claim:

1. A microporous membrane which has a bubble point value measured by the use of ethanol (by the test method of JIS K3832) falling in the range of from 10 kPa to 1000 kPa and is formed of a polymer prepared by ring opening polymerization of a compound represented by the following chemical formula (I):

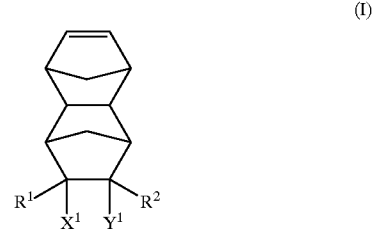

(I)

wherein $R^1$ and $R^2$ each represent a hydrogen atom or a hydrocarbon group having 1 to 10 carbon atoms; $X^1$ and $Y^1$ each represent a hydrogen atom, a hydrocarbon group having 1 to 10 carbon atoms, a halogen atom, a halogen-substituted hydrocarbon group having 1 to 10 carbon atoms, $-(CH_2)_n COOR^{11}$, $-(CH_2)_n CN$, $-(CH_2)_n CONR^{11}R^{12}$, $-(CH_2)_n COOZ$, $-(CH_2)_n OZ$, $-(CH_2)_n W$, or $(-CO)_2 O$ or $(-CO)_2 NR^{14}$ formed by $X^1$ and $Y^1$; $R^{11}$, $R^{12}$, $R^{13}$ and $R^{14}$ each represent a hydrocarbon group having 1 to 20 carbon atoms; Z represents a hydrocarbon group or a halogen-substituted hydrocarbon group; W represents $SiR^{15}_p D_{3-p}$ ($R^{15}$ represents a hydrocarbon group having 1 to 10 carbon atoms; D represents a halogen atom, $-OCOR^{15}$, or $-OR^{15}$; and p represents an integer of 0 to 3.);

and n represents an integer of 0 to 10.

2. A microporous membrane as claimed in claim 1 in which said polymer comprises a ring opening polymer or ring opening copolymer represented by the following chemical formula (II):

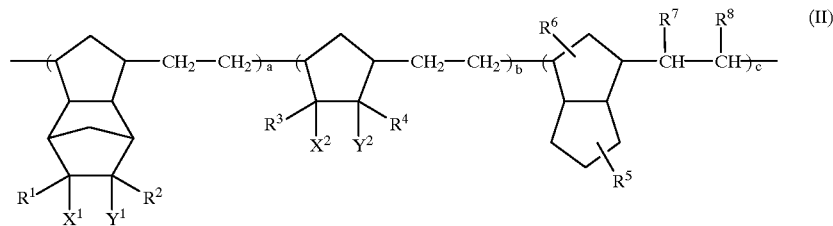

(II)

wherein $R^1$, $R^2$, $X^1$ and $Y^1$ each have the same meanings as defined in chemical formula (I); $R^3$ to $R^5$ each represent a hydrogen atom or a hydrocarbon group having 1 to 10 carbon atoms; $R^6$ to $R^8$ each represent a hydrogen atom or a hydrocarbon group having 1 to 6 carbon atoms; $X^2$ and $Y^2$ each represent a hydrogen atom, a hydrocarbon group having 1 to 10 carbon atoms, a halogen atom, a halogen-substituted hydrocarbon group having 1 to 10 carbon atoms, $-(CH_2)_n COOR^{11}$, $-(CH_2)_n CN$, $-(CH_2)_n CONR^{11}R^{12}$, —$(CH_2)_nCOOZ$, —$(CH_2)_nOZ$, —$(CH_2)_nW$, or (—$CO)_2O$ or (—$CO)_2NR^{14}$ formed by $X^2$ and $Y^2$; $R^{11}$, $R^{12}$, $R^{13}$, and $R^{14}$ each represent a hydrocarbon group having 1 to 20 carbon atoms; Z represents a hydrocarbon group or a halogen-substituted hydrocarbon group; W represents $SiR^{15}_pD_{3-p}$ ($R^{15}$ represents a hydrocarbon group having 1 to 10 carbon atoms; D represents a halogen atom, —$OCOR^{15}$, or —$OR^{15}$; and p is an integer of 0 to 3.); n represents an integer of 0 to 10; a is an integer of 1 to 2000; b and c are integers of 1 to 2000, respectively; and in addition, a, b and c satisfy the following relations: $0 \leq a/(a+b+c) \leq 1$, $0 \leq b/(a+b+c) \leq 1$, and $0 \leq c/(a+b+c) \leq 1$.

3. A process for producing a microporous membrane in which the polymer prepared by ring opening polymerization of a compound represented by the following chemical formula (I) is heated and dissolved in a solvent (a) in which said polymer is soluble, and the resulting solution is casted to form a membrane, rapidly cooled, and extracted with a solvent (b) in which said polymer is insoluble to remove the solvent (a), thus to obtain a microporous membrane falling in the range of from 10 kPa to 1000 kPa in bubble point value measured by the use of ethanol (by the method of ASTM F316):

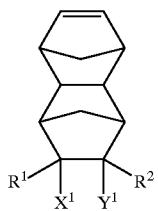

(I)

wherein $R^1$ and $R^2$ each represent a hydrogen atom or a hydrocarbon group having 1 to 10 carbon atoms; $X^1$ and $Y^1$ each represent a hydrogen atom, a hydrocarbon group having 1 to 10 carbon atoms, a halogen atom, a halogen-substituted hydrocarbon group having 1 to 10 carbon atoms, —$(CH_2)_nCOOR^{11}$, —$(CH_2)_nCN$, —$(CH_2)_nCONR^{11}R^{12}$, —$(CH_2)_nCOOZ$, —$(CH_2)_nOZ$, —$(CH_2)_nW$, or (—$CO)_2O$ or (—$CO)_2NR^{14}$ formed by $X^1$ and $Y^1$; $R^{11}$, $R^{12}$, $R^{13}$, and $R^{14}$ each represent a hydrocarbon group having 1 to 20 carbon atoms; Z represents a hydrocarbon group or a halogen-substituted hydrocarbon group; W represents $SiR^{15}_pD_{3-p}$ ($R^{15}$ represents a hydrocarbon group having 1 to 10 carbon atoms; D represents a halogen atom, —$OCOR^{15}$, or —$OR^{15}$; and p represents an integer of 0 to 3.); and n represents an integer of 0 to 10.

4. A process as claimed in claim 3 in which said polymer is a ring opening polymer or a ring opening copolymer represented by the following chemical formula (II):

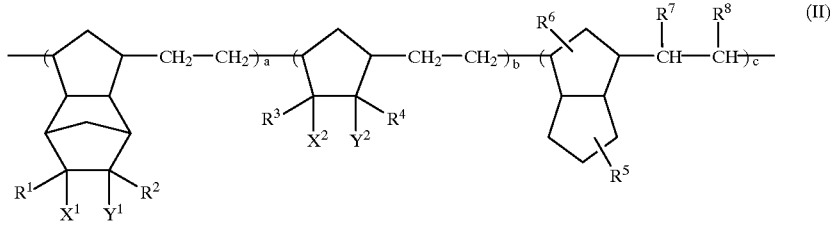

(II)

In the formula, $R^1$, $R^2$, $X^1$ and $Y^1$ each have the same meanings as defined in chemical formula (I); $R^3$ to $R^5$ each represent a hydrogen atom or a hydrocarbon group having 1 to 10 carbon atoms; $R^6$ to $R^8$ each represent a hydrogen atom or a hydrocarbon group having 1 to 6 carbon atoms; $X^2$ and $Y^2$ each represent a hydrogen atom, a hydrocarbon group having 1 to 10 carbon atoms, a halogen atom, a halogen-substituted hydrocarbon group having 1 to 10 carbon atoms, —$(CH_2)_nCOOR^{11}$, —$(CH_2)_nCN$, —$(CH_2)_nCONR^{11}R^{12}$, —$(CH_2)_nCOOZ$, —$(CH_2)_nOZ$, —$(CH_2)_nW$, or (—$CO)_2O$ or (—$CO)_2NR^{14}$ formed by $X^2$ and $Y^2$; $R^{11}$, $R^{12}$, $R^{13}$, and $R^{14}$ each represent a hydrocarbon group having 1 to 20 carbon atoms; Z represents a hydrocarbon group or a halogen-substituted hydrocarbon group; W represents $SiR^{15}_pD_{3-p}$ ($R^{15}$ represents a hydrocarbon group having 1 to 10 carbon atoms; D represents a halogen atom, —$OCOR^{15}$, or —$OR^{15}$; and p represents an integer of 0 to 3.); n represents an integer of 0 to 10; a is an integer of 1 to 2000; and b and c are integers of 1 to 2000, respectively, and in addition, a, b, and c satisfy the following relations: $0 \leq a/(a+b+c) \leq 1$, $0 \leq b/(a+b+c) \leq 1$, and $0 \leq c/(a+b+c) \leq 1$.

5. A process for producing a microporous membrane in which a solution comprising a polymer prepared by ring opening polymerization of a compound represented by the following chemical formula (I), a good solvent (c) for said polymer having a lower boiling point than water, a poor solvent (d) for said polymer having a higher boiling point than the good solvent (c), and water is casted on a support to form a membrane, and the solvents are slowly evaporated to cause phase separation in said solution:

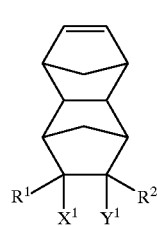

(I)

wherein $R^1$ and $R^2$ each represent a hydrogen atom or a hydrocarbon group having 1 to 10 carbon atoms; $X^1$ and $Y^1$ each represent a hydrogen atom, a hydrocarbon group having 1 to 10 carbon atoms, a halogen atom, a halogen-substituted hydrocarbon group having 1 to 10 carbon atoms, —$(CH_2)_n COOR^{11}$, —$(CH_2)_n CN$, —$(CH_2)_n CONR^{11}R^{12}$, —$(CH_2)_n COOZ$, —$(CH_2)_n OZ$, —$(CH_2)_n W$, or (—$CO)_2 O$ or (—$CO)_2 NR^{14}$ formed by $X^1$ and $Y^1$; $R^{11}$, $R^{12}$, $R^{13}$, and $R^{14}$ each represent a hydrocarbon group having 1 to 20 carbon atoms; Z represents a hydrocarbon group or a halogen-substituted hydrocarbon group; W represents $SiR^{15}_p D_{3-p}$ ($R^{15}$ represents a hydrocarbon group having 1 to 10 carbon atoms; D represents a halogen atom, —$OCOR^{15}$ or —$OR^{15}$; and p represents an integer of 0 to 3.); and n represents an integer of 0 to 10.

6. A process as claimed in claim 5 in which said polymer is an ring opening polymer or ring opening copolymer represented by the following chemical formula (II):

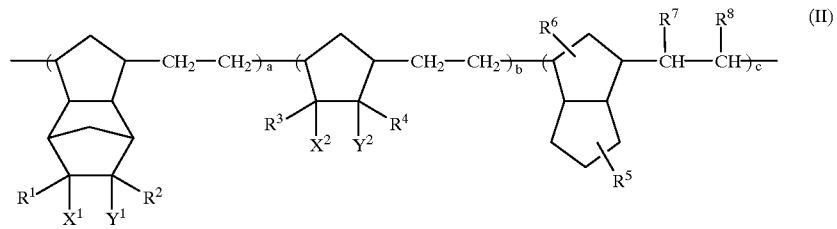

wherein $R^1$, $R^2$, $X^1$, and $Y^1$ each have the same meanings as defined by chemical formula (I); $R^3$ to $R^5$ each represent a hydrogen atom or a hydrocarbon group having 1 to 10 carbon atoms; $R^6$ to $R^8$ each represent a hydrogen atom or a hydrocarbon group having 1 to 6 carbon atoms; $X^2$ and $Y^2$ each represent a hydrogen atom, a hydrocarbon group having 1 to 10 carbon atoms, a halogen atom, a halogen-substituted hydrocarbon group having 1 to 10 carbon atoms, —$(CH_2)_n COOR^{11}$, —$(CH_2)_n CN$, —$(CH_2)_n CONR^{11}R^{12}$, —$(CH_2)_n COOZ$, —$(CH_2)_n OZ$, —$(CH_2)_n W$, or (—$CO)_2 O$ or (—$CO)_2 NR^{14}$ formed by $X^2$ and $Y^2$; $R^{11}$, $R^{12}$, $R^{13}$, and $R^{14}$ each represent a hydrocarbon group having 1 to 20 carbon atoms; Z represents a hydrocarbon group or a halogen-substituted hydrocarbon group; W represents $SiR^{15}_p D_{3-p}$ ($R^{15}$ represents a hydrocarbon group having 1 to 10 carbon atoms; D represents a halogen atom, —$OCOR^{15}$, or —$OR^{15}$; and p represents an integer of 0 to 3.); n represents an integer of 0 to 10; a is an integer of 1 to 2000; b and c are integers of 1 to 2000, respectively, and in addition, a, b, and c satisfy the following relations: $0 \leq a/(a+b+c) \leq 1$, $0 \leq b/(a+b+c) \leq 1$, and $0 \leq c/(a+b+c) \leq 1$.

* * * * *